(12) United States Patent
Cho et al.

(10) Patent No.: US 8,384,961 B2
(45) Date of Patent: Feb. 26, 2013

(54) METHOD OF CREATING COLOR-MAPPING LOOKUP TABLE AND COLOR-MAPPING METHOD USING THE SAME

(75) Inventors: Min-ki Cho, Seoul (KR); Heul-keun Choh, Seongnam-si (KR); Dae-won Kim, Daegu (KR); Byoung-ho Kang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1133 days.

(21) Appl. No.: 11/326,310

(22) Filed: Jan. 6, 2006

(65) Prior Publication Data

US 2006/0158671 A1 Jul. 20, 2006

(30) Foreign Application Priority Data

Jan. 18, 2005 (KR) .................. 10-2005-0004700

(51) Int. Cl.
*H04N 1/40* (2006.01)
(52) U.S. Cl. ...................................................... 358/3.23
(58) Field of Classification Search .................. 358/1.9, 358/518, 3.23, 75; 708/318; 418/591; 345/591
See application file for complete search history.

(56) References Cited

U.S. PATENT DOCUMENTS

| | | | | |
|---|---|---|---|---|
| 5,510,910 A * | 4/1996 | Bockman et al. | ............. | 358/502 |
| 5,557,712 A * | 9/1996 | Guay | ............................. | 345/611 |
| 5,627,950 A * | 5/1997 | Stokes | ............................ | 345/591 |
| 5,721,572 A * | 2/1998 | Wan et al. | ...................... | 345/590 |
| 5,740,076 A * | 4/1998 | Lindbloom | .................... | 345/590 |
| 5,786,908 A * | 7/1998 | Liang | ............................. | 358/518 |
| 6,215,561 B1 * | 4/2001 | Kakutani | ....................... | 358/1.9 |
| 7,440,135 B2 * | 10/2008 | Arai et al. | ....................... | 358/1.9 |
| 2005/0078327 A1 * | 4/2005 | Majewicz | ....................... | 358/1.9 |

FOREIGN PATENT DOCUMENTS

| | | |
|---|---|---|
| EP | 1 349 373 | 10/2003 |
| JP | 10-136216 | 5/1998 |
| JP | 2005-269201 | 9/2005 |

OTHER PUBLICATIONS

Office Action issued in corresponding Chinese Patent Application No. 2006100014264, on Jul. 27, 2007.
Office Action issued in corresponding Japanese Patent Application No. 2006-010284, mailed on Nov. 13, 2007.

* cited by examiner

*Primary Examiner* — Benny Q Tieu
*Assistant Examiner* — Jeremiah Bryar
(74) *Attorney, Agent, or Firm* — Staas & Halsey LLP

(57) ABSTRACT

Disclosed is a method of creating a color-mapping lookup table and a color-mapping method using the same. The method of creating a color-mapping lookup table includes; obtaining color-space data for respective solid colors specified as lattice points of the color-mapping lookup table, obtaining color-space data for respective achromatic colors specified as lattice points of the color-mapping lookup table, and tabulating the color-space data for the respective solid colors specified as the lattice points and the color-space for the respective achromatic colors specified as the lattice points. Therefore, the methods can create a color-mapping LUT in which significant colors such as solid colors or achromatic colors are specified as lattice points, so that significant colors are more optimally reproduced since device data for the significant colors are not calculated through interpolation.

12 Claims, 5 Drawing Sheets

UNIFORM PACKING

NON-UNIFORM PACKING

FIG. 3A

CIELAB DATA OF RGBCMY ACCORDING TO sRGB(ILLUMINANT: D65)

| sRGB | CIEL | CIEA | CIEB |
|---|---|---|---|
| RED | 53.23 | 80.11 | 67.22 |
| YELLOW | 97.14 | -21.56 | 94.49 |
| GREEN | 87.74 | -86.19 | 83.19 |
| CYAN | 91.12 | -48.08 | -14.13 |
| BLUE | 32.30 | 79.19 | -107.85 |
| MAGENTA | 60.32 | 98.25 | -60.83 |

FIG. 3B

CIELAB DATA OF BLACK/WHITE ACCORING TO sRGB(ILLUMINANT: D65)

| sRGB | CIEL | CIEA | CIEB |
|---|---|---|---|
| BLACK | 0.00 | 0.00 | 0.00 |
| WHITE | 100.00 | 0.00 | 0.00 |

METHOD OF CREATING COLOR-MAPPING LOOKUP TABLE AND COLOR-MAPPING METHOD USING THE SAME

CROSS-REFERENCE TO RELATED APPLICATION

This application claims benefit under 35 U.S.C. §119 from Korean Patent Application No. 10-2005-004700, filed on Jan. 18, 2005, the entire contents of which are incorporated herein by reference.

BACKGROUND OF THE INVENTION

1. Field of the Invention

The present invention relates to a method of creating a color-mapping lookup table (LUT) and a color-mapping method using the same, and more particularly, to a method of creating a color-mapping LUT in which significant colors are specified as lattice points and a color-mapping method using the same.

2. Description of the Related Art

A color-mapping LUT is a table referred to for mapping an input color into a predetermined color-space. The color-mapping LUT is created by packing a color space, specifying lattice points, and tabulating color-space data for colors at the specified lattice points.

There are several color-space packing methods, but two typical methods are shown in FIGS. 1A and 1B. FIG. 1A shows an LUT configured with lattice points specified on uniform packing, and FIG. 1B shows an LUT configured with lattice points on non-uniform packing.

Any of the methods shown in FIGS. 1A and 1B does not mostly specify significant colors such as solid colors or achromatic colors as lattice points of an LUT. Accordingly, device data for the significant colors described above is calculated through interpolation using device data at the lattice points existing around the significant colors.

However, if device data for significant colors are calculated through interpolation, accurate device data cannot be obtained since the device data for the significant colors are approximately calculated, so that correct device data cannot be obtained.

Since such inaccuracy of device data for significant colors results in a problem that the significant colors cannot be optimally reproduced, a method is requested for a solution to the problem.

SUMMARY OF THE INVENTION

Additional aspects and/or advantages of the invention will be set forth in part in the description which follows and, in part, will be apparent from the description, or may be learned by practice of the invention.

The present invention has been developed in order to solve the above drawbacks and other problems associated with the conventional arrangement. An aspect of the present invention is to provide a method of creating a color-mapping LUT and a color-mapping method using the same, in which significant colors are specified as lattice points of an LUT so as to be more optimally reproducible, thereby reproducing the colors more optimally.

The foregoing and other objects and advantages are substantially realized by providing a method of creating a color-mapping lookup table, including operations of obtaining color-space data for respective solid colors specified as lattice points of the color-mapping lookup table; obtaining color-space data for respective achromatic colors specified as lattice points of the color-mapping lookup table; and tabulating the color-space data for the respective solid colors specified as the lattice points and the color-space data for the respective achromatic colors specified as the lattice points.

Further, the solid colors specified as the lattice points include red, green, blue, cyan, magenta, and yellow colors.

Further, the color-space data for the respective solid colors specified as the lattice points is any of CIELAB data, CIEXYZ data, and CIECAM data for the respective solid colors specified as the lattice points.

The method further includes operations obtaining color-space data for boundary colors specified as lattice points of the color-mapping lookup table, the boundary colors being taken out of plural boundary colors located on boundaries of a color gamut for any of the solid colors specified as the lattice points; and tabulating the color-space data for the boundary colors specified as the lattice points.

The operation of obtaining the color-space data for the boundary colors specified as lattice points of the color-mapping lookup table specifies as a lattice point of the color-mapping lookup table any of the boundary colors located on boundaries of a color gamut for any of the solid colors specified as the lattice points, using either a device-dependent color space or a device-independent color space.

The device-dependent color space is either an HSV (Hue, Saturation, and Value) color space or an HSI (Hue Saturation Intensity) color space, and the device-independent color space is either a CIELAB color space or a CIECAM color space.

The method further includes operations obtaining color-space data for memory colors specified as lattice points of the color-mapping lookup table, and tabulating the color-space data for the memory colors specified as the lattice points.

The foregoing and other objects and advantages are substantially realized by providing a color-mapping method, including operation of inputting a color to be mapped into a device color space; judging whether the input color represents a lattice point of a color-mapping lookup table or not, using the color-mapping lookup table created with tabulating color-space data for respective solid colors specified as lattice points of the color-mapping lookup table and color-space data for respective achromatic colors specified as lattice points of the color-mapping lookup table; and extracting and outputting device data for a corresponding lattice point if the input color is judged to represent a lattice point of the color-mapping lookup table.

Further, the color-mapping lookup table further includes tabulated color-space data for boundary colors specified as lattice points thereof, the boundary colors being taken out of boundary colors located on boundaries of a color gamut for any of the solid colors specified as the lattice points.

The color-mapping lookup table further includes tabulated color-space data for memory colors specified as lattice points thereof.

The method further includes operations of, if the input color is judged not to represent a lattice point of the color-mapping lookup table, extracting device data for lattice points existing around the input color; and outputting device data for the input color through interpolation using the extracted device data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3A is a view for explaining CIELAB data for solid colors specified as lattice points of an LUT;

FIG. 3B is a view for explaining CIELAB data for achromatic colors specified as lattice points of an LUT;

DETAILED DESCRIPTION OF THE PREFERRED EMBODIMENTS

Figure 1A:
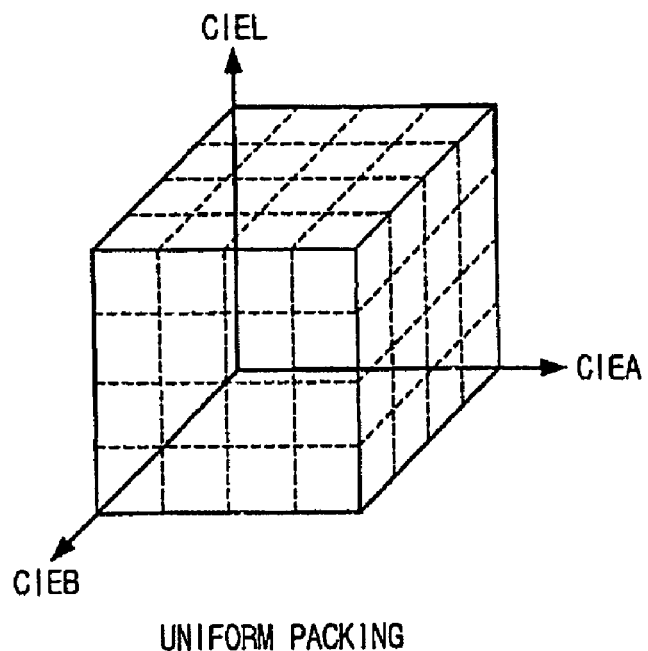
FIG. 1A is a view for explaining an LUT configured with lattice points specified on uniform packing.
Figure 1B:
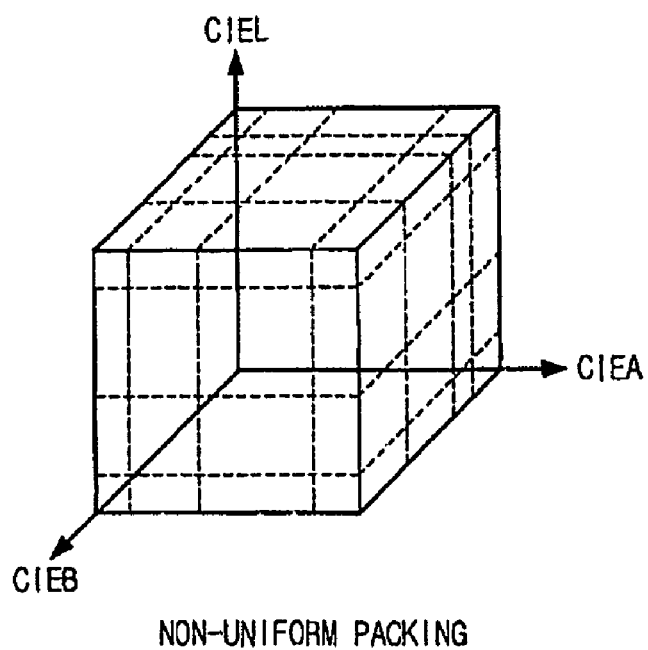
FIG. 1B is a view for explaining an LUT configured with lattice points specified on non-uniform packing.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, the present invention will be described in detail with reference to the accompanying drawings.

The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
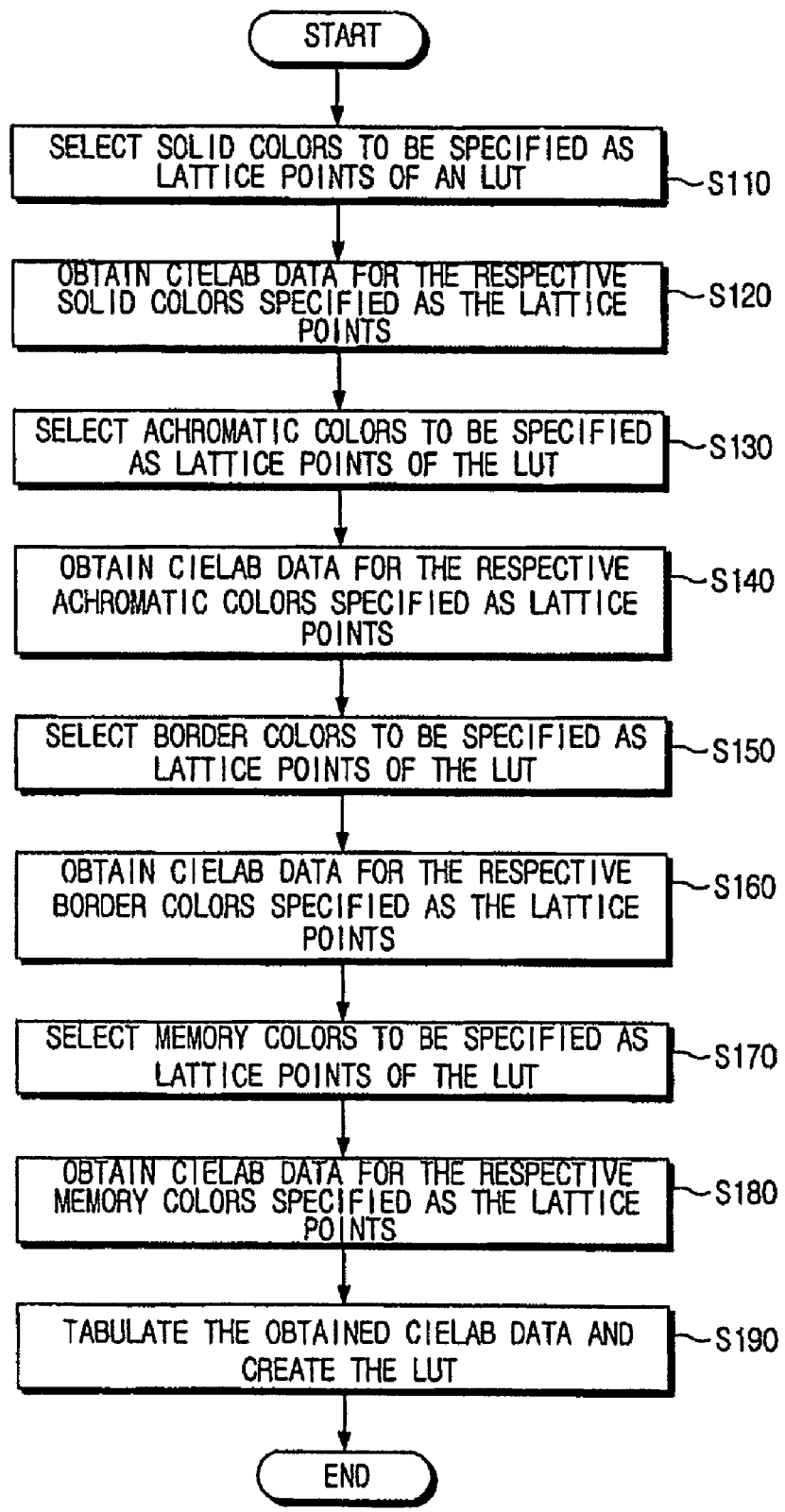
FIG. 2 is a flow chart for explaining a method of creating a color-mapping LUT according to an embodiment of the present invention.

FIG. 2 is a flow chart for explaining a method of creating a color-mapping LUT according to an embodiment of the present invention. For creation of a color-mapping LUT, significant colors are specified as lattice points of the LUT. The present embodiment will refer to solid colors, achromatic colors, boundary colors, memory colors, and the like, for significant colors.

For implementation of the present embodiment, any of the CIELAB color space, CIEXYZ color space, and CIECAM color space, which are the Profile Connection Space (PCS) defined by the Commission Internationale de l'Eclaiage (CIE), can be applied as a color space. However, hereinafter, description will be made, for convenience, under assumption that a color space is the CIELAB color space.

In FIG. 2, first, solid colors to be specified as lattice points of a color-mapping LUT are selected (S110). The operation S110 can specify red, green, blue, cyan, magenta, and yellow colors as lattice points of a color-mapping LUT. However, in the operation S110, basically, there is no limitation to the number and kinds of solid colors that are to be specified as lattice points of the color-mapping LUT. Therefore, solid colors other than the solid colors listed above can be specified as lattice points of the color-mapping LUT.

Next, the CIELAB data being color-space data for the respective solid colors specified as lattice points in the operation S110 are obtained (S120). The CIELAB data correspond to the coordinate values of corresponding solid colors in the CIELAB color space.

CIELAB data for the respective solid colors specified as lattice points can be obtained i) by a method of directly calculating the CIELAB data for the respective solid colors specified as lattice points by using processors and algorithms, but ii) the official CIELAB data per se, which are calculated in advance, can be used for acquisition of the CIELAB data for the respective solid colors specified as lattice points.

FIG. 3A shows CIEL data, CIEA data, and CIEB data, which are the CIELAB data for respective red, green, blue, cyan, magenta, and yellow colors obtained in operation S120, if solid colors specified as lattice points in the operation S110 are the red, green, blue, cyan, magenta, and yellow colors.

Next, operation S130 selects achromatic colors to be specified as lattice points of the color-mapping LUT. Then, operation S140 obtains CIELAB data for the respective achromatic colors specified as lattice points. The same as for the solid colors is applied to the acquisition of the CIELAB data for the respective achromatic colors specified as lattice points through the direct calculation or the official CIELAB data usage.

FIG. 3B shows CIEL data, CIEA data, and CIEB data, which are the CIELAB data for respective black and white colors and obtained in operation S140, if the operation S130 specifies the solid colors, that is, the black and white colors as lattice points.

On the other hand, as for the solid colors, there is no limitation to the number and kinds of achromatic colors that are to be specified as lattice points of the color-mapping LUT in operation S130. That is, it is possible for gray colors besides the black and white colors to be specified as lattice points of the color-mapping LUT even though the gray colors have different CIEL data respectively.

Next, operation S150 selects boundary colors to be specified as lattice points of the color-mapping LUT. In here, the boundary colors refer to colors located on the boundaries of a color gamut for any of the plural solid colors specified in the operation S110 as lattice points of the color-mapping LUT.

The present embodiment specifies boundary colors, besides the solid colors and achromatic colors, as lattice points of the color-mapping LUT since the boundary colors play important roles when calculating CIELAB data for colors out of the lattice points through interpolation.

Figure 4:
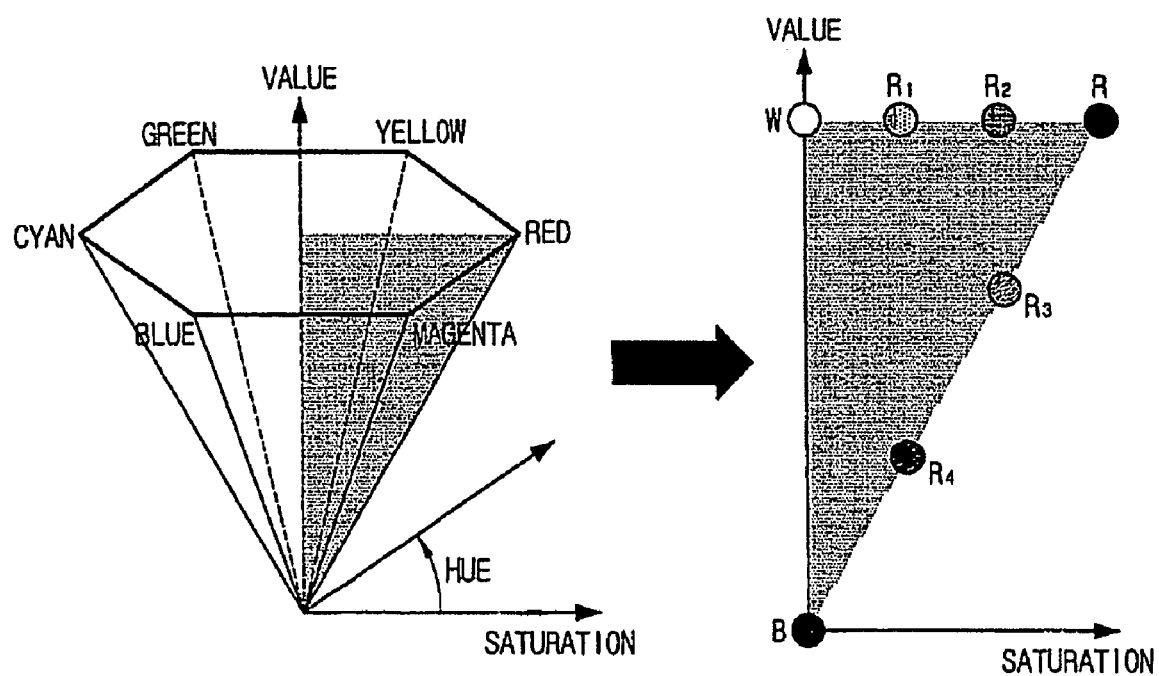
FIG. 4 is a view for explaining a method of selecting boundary colors to be specified as lattice points of an LUT.

FIG. 4 shows a method of selecting boundary colors to be specified as lattice points of an LUT. FIG. 4 shows that the boundaries of a color gamut for a red color are evenly divided on the HSV color space and four boundary colors $R_1$, $R_2$, $R_3$, and $R_4$ are selected.

In operation S150, basically, there is no limitation to the number of and selection methods of boundary colors that are to be specified as lattice points of the color-mapping LUT. Therefore, boundary colors are neither limited to the four boundary colors as shown in FIG. 4, nor selected through the even division of a color gamut.

In addition, there is no limitation to the kinds of color spaces used for selection of boundary colors. Therefore, the color space used for selection of boundary colors is not limited to the HSV color space, as shown in FIG. 4. That is, a device-dependent perceptual color space such as HSV color space or HSI color space can be used, or a device-independent perceptual color space such as CIELAB color space or CICAM color space can be used as well, for a color space used for selection of boundary colors.

In addition, it is not necessary to select only boundary colors of a color gamut for one solid color. That is, besides the boundary colors of a color gamut for a red color, it is possible to select the boundary colors of the color gamut's for green and blue colors as well. Further, it is possible to specify as lattice points of a color-mapping LUT the boundary colors of color gamut's for the solid colors not specified as the lattice points in the operation S110.

Next, operation S160 obtains CIELAB data for the respective boundary colors specified in the operation S150 as lattice points.

Next, operation S170 selects memory colors to be specified as lattice points of the color-mapping LUT. In here, the memory colors refer to the colors of objects named and memorized with the name of the objects. For example, skin color, blue-sky color, green-grass color, and the like correspond to memory colors.

The present embodiment specifies as lattice points of a color-mapping LUT the memory colors besides the solid colors, achromatic colors, and boundary colors, since human beings are familiar with the memory colors and human eyes are sensitive to the memory colors.

Also, as for the solid, achromatic, and boundary colors, there is no limitation to the number and kinds of the memory colors to be specified in operation S170 as lattice points of the color-mapping LUT. That is, the other memory colors besides skin color, blue-sky color, and green-grass color can also be specified as lattice points of the color-mapping LUT.

Next, operation S180 obtains CIELAB data for the respective memory colors specified as lattice points in the operation S170. In the same manner as for the solid colors and achromatic colors, it is also possible to obtain CIELAB data for specified memory colors through the direct calculations or using the official CIELAB data.

Next, operation S190 tabulates the CIELAB data obtained so far, and then creates a color-mapping LUT. That is, the operation S190 tabulates the CIELAB data for the solid colors, CIELAB data for the achromatic colors, CIELAB data for the boundary colors, and CIELAB data for the memory colors obtained in operations S120, S140, S160, and S180, respectively, and then creates a color-mapping LUT.

So far, description has been made on a method of creating a color-mapping LUT by specifying significant colors as lattice points of an LUT. Further, solid colors, achromatic colors, boundary colors, and memory colors are taken as examples of significant colors.

It is emphasized that, in implementing a method of creating a color-mapping LUT, all the mentioned operations are not necessarily included, but can be selectively included. For example, if a color-mapping LUT is created through only the operations S110 to S140 and S190, a color-mapping LUT can be created, in which only the solid colors and achromatic colors are specified as lattice points.

However, the more lattice points are specified in a color-mapping LUT, the more accurate color-mapping can be accomplished. Therefore, it is advantageous for optimal color reproduction to specify as many significant colors as possible as lattice points as long as the LUT space allows.

Hereinafter, description will be made in detail on a color-mapping process using a color-mapping LUT created by methods explained so far with reference to FIG. 5.

Figure 5:
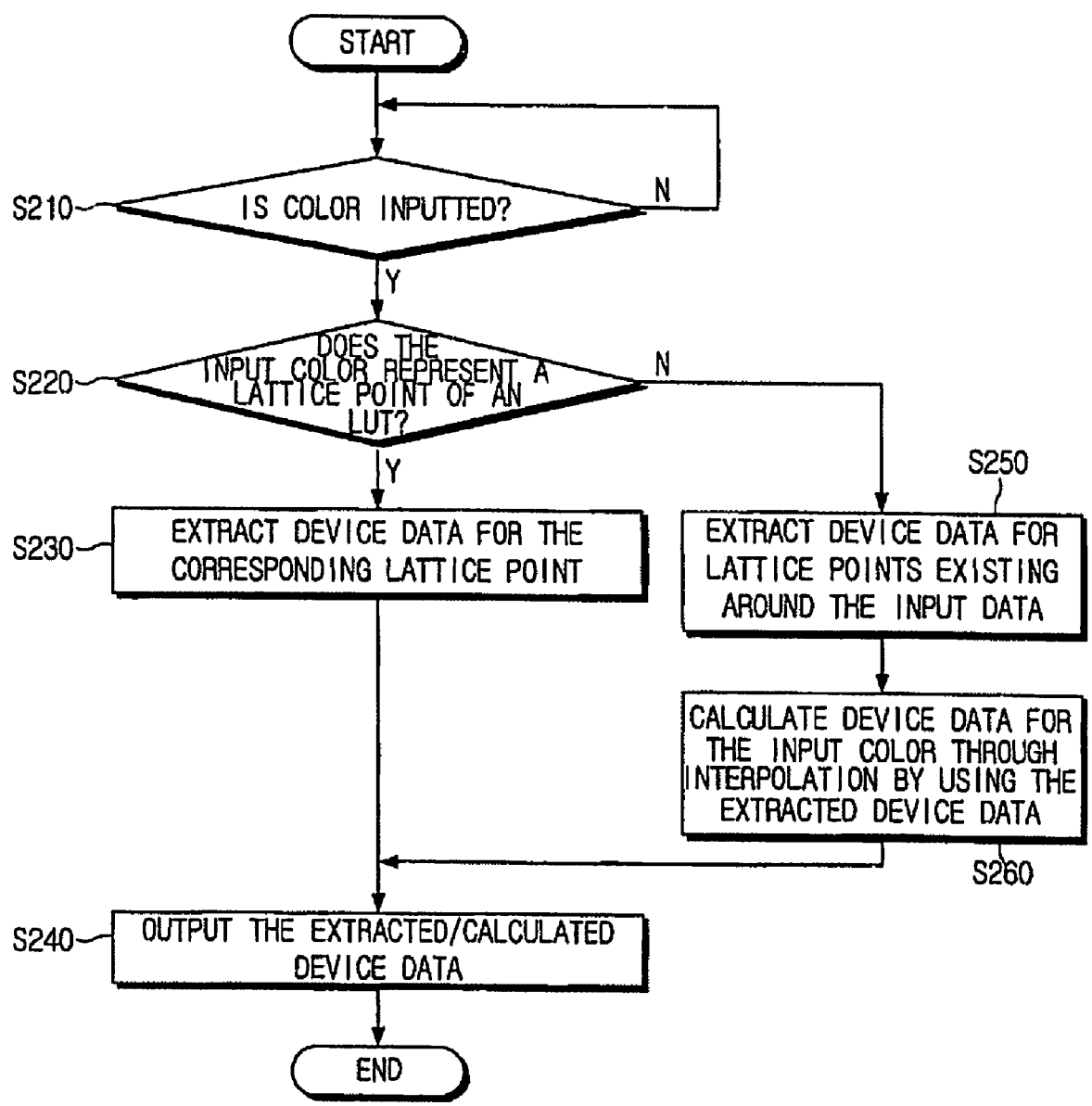
FIG. 5 is a flow chart for explaining a color-mapping method using the color-mapping LUT created as shown in FIG. 2 according to an embodiment of the present invention.

FIG. 5 is a flow chart for explaining a color-mapping method using a color-mapping LUT created along the flow chart in FIG. 2 according to one embodiment of the present invention.

In FIG. 5, first, if operation S210 inputs a color to be mapped into a device color-space, operation S220 judges whether the input color represents a lattice point of the color-mapping LUT or not.

If the operation S220 judges that the input color represents the lattice point, operation S230 extracts device data for the corresponding lattice point. Then, operation S240 outputs the extracted device data.

The operation S220 judges that the input color represents a lattice point when the input color is a significant color. More specifically, it is when the input color is a solid color, achromatic color, boundary color, or memory color. It is because significant colors are specified as lattice points of the color-mapping LUT created according to the flow chart shown in FIG. 2.

In this case, device data for the input color is not calculated through interpolation, so the input color is more optimally reproduced.

On the other hand, if the operation S220 judges the input color does not represent a lattice point, an operation S250 extracts device data for lattice points existing around the input color. Next, an operation S260 calculates device data for the input color through interpolation using the extracted device data, and the operation S240 outputs the calculated device data.

So far, description has been made in detail on the color-mapping process using a color-mapping LUT in which significant colors are specified as lattice points of the LUT. In addition, description has been also made on excellent reproducibility of significant colors.

As aforementioned, the present invention can create a color-mapping LUT specifying as lattice points the significant colors such as solid colors, achromatic colors, boundary colors, or memory colors, and can perform color-mapping, using the LUT. Accordingly, the present invention does not calculate color-space data for significant colors through interpolation, so as to more optimally reproduce the significant colors.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of creating a color-mapping lookup table, the method comprising:
    obtaining, by way of a processor, color-space data for respective solid colors specified as lattice points of the color-mapping lookup table;
    obtaining color-space data for respective achromatic colors specified as lattice points of the color-mapping lookup table;
    obtaining color-space data for boundary colors specified as lattice points of the color-mapping lookup table, the boundary colors being taken out of plural boundary colors located on boundaries of a color gamut for any of the solid colors not specified as the lattice points;
    obtaining color-space data for memory colors specified as lattice points of the color-mapping lookup table;
    creating the color-mapping look-up table by tabulating the color-space data for each of the respective solid colors specified as the lattice points, the respective achromatic colors specified as the lattice points and the respective boundary colors specified as the lattice points and respective memory colors specified as the lattice points;
    calculating color-space data for colors not specified as lattice points based on the tabulated color-space data for the respective solid colors, the respective achromatic colors, the respective boundary colors, and the respective memory colors; and outputting the calculated color-space data.

2. The method as claimed in claim 1, wherein the solid colors specified as the lattice points include red, green, blue, cyan, magenta, and yellow colors.

3. The method as claimed in claim 2, wherein the color-space data for the respective solid colors specified as the lattice points is any of CIELAB data, CIEXYZ data, and CIECAM data for the respective solid colors specified as the lattice points.

4. The method as claimed in claim 3, wherein the operation of obtaining the color-space data for the boundary colors specified as lattice points of the color-mapping lookup table specifies as a lattice point of the color-mapping lookup table any of the boundary colors located on boundaries of a color gamut for any of the solid colors specified as the lattice points, using either a device-dependent color space or a device-independent color space.

5. The method as claimed in claim 4, wherein the device-dependent color space is either a HSV (hue, saturation, value) color space or a HSI (hue, saturation, intensity) color space, and the device-independent color space is either a CIELAB color space or a CIECAM color space.

6. The method as claimed in claim 1, wherein, when one or more solid colors are not specified as lattice points, boundary colors for the one or more solid colors are specified as lattice points.

7. A color-mapping method comprising:
inputting a color to be mapped into a device color space;
judging whether the input color represents a lattice point of a color-mapping lookup table, using a color-mapping lookup table created by tabulating color-space data for respective solid colors specified as lattice points of the color-mapping lookup table, color-space data for respective achromatic colors specified as lattice points of the color-mapping lookup table, color-space data for respective boundary colors specified as lattice points of the color-mapping lookup table, and color-space data for respective memory colors specified as lattice points of the color-mapping lookup table, wherein the color-space data for the respective solid colors specified as lattice points of the color-mapping lookup table is obtained using a processor; and
extracting and outputting device data for a corresponding lattice point if the input color is judged to represent a lattice point of the color-mapping lookup table,
wherein the respective boundary colors are taken out of plural boundary colors located on boundaries of a color gamut for any of solid colors not specified as the lattice points.

8. The method as claimed in claim 7, further comprising:
if the input color is judged not to represent a lattice point of the color-mapping lookup table,
extracting device data for lattice points existing around the input color; and
outputting device data for the input color through interpolation using the extracted device data.

9. A method of creating a color-mapping lookup table, the method comprising:
specifying a plurality of significant colors as lattice points of the color-mapping lookup table, the plurality of significant colors including solid colors, achromatic colors, memory colors and boundary colors, the boundary colors being taken out of plural boundary colors located on boundaries of a color gamut for any of solid colors not specified as the lattice points;
obtaining color-space data for the plurality of significant colors specified as lattice points of the color-mapping lookup table, wherein the color-space data for the respective solid colors specified as lattice points of the color-mapping lookup table is obtained using a processor;
tabulating the color-space data for the significant colors specified as the lattice points; and
calculating color-space data for colors not specified as the lattice points based on the tabulated color-space data for the significant colors.

10. The method as claimed in claim 9, wherein the colors not specified as the lattice points are not significant colors.

11. The method as claimed in claim 10, wherein the color-space data for the colors not specified as lattice points is calculated by interpolating lattice points existing around the color-space data.

12. A method of creating a color-mapping lookup table, the method comprising:
specifying a plurality of solid colors as lattice points of the color-mapping lookup table;
obtaining, using a processor, color-space data for the plurality of solid colors specified as lattice points of the color-mapping lookup table, color-space data for a plurality of achromatic colors specified as lattice points of the color-mapping lookup table, color-space data for a plurality of boundary colors specified as lattice points of the color-mapping lookup table, and color-space data for a plurality of memory colors specified as lattice points of the color-mapping lookup table;
tabulating the color-space data for the solid colors specified as the lattice points, the boundary colors specified as the lattice points, the achromatic colors specified as the lattice points, and the memory colors specified as the lattice points; and
calculating color-space data for colors not specified as the lattice points based on the tabulated color-space data for the solid colors, the boundary colors, the achromatic colors, and the memory colors,
wherein the boundary colors are taken out of plural boundary colors located on boundaries of a color gamut for any of solid colors not specified as the lattice points.

* * * * *